Feb. 2, 1971
R. B. LESHER
3,559,328
LINE-CASTER ATTACHMENT FOR FISHING ROD
Filed Dec. 24, 1968
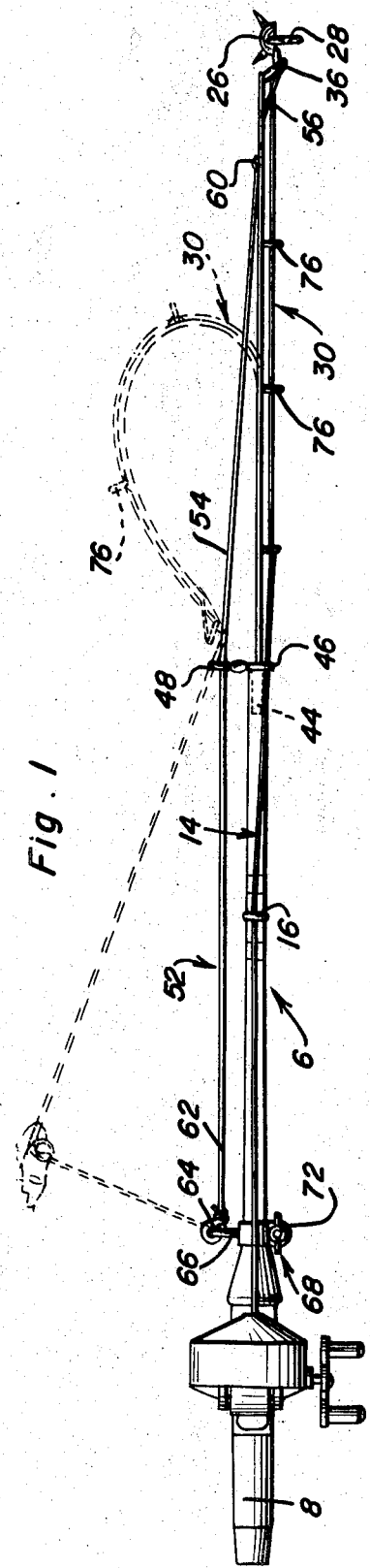
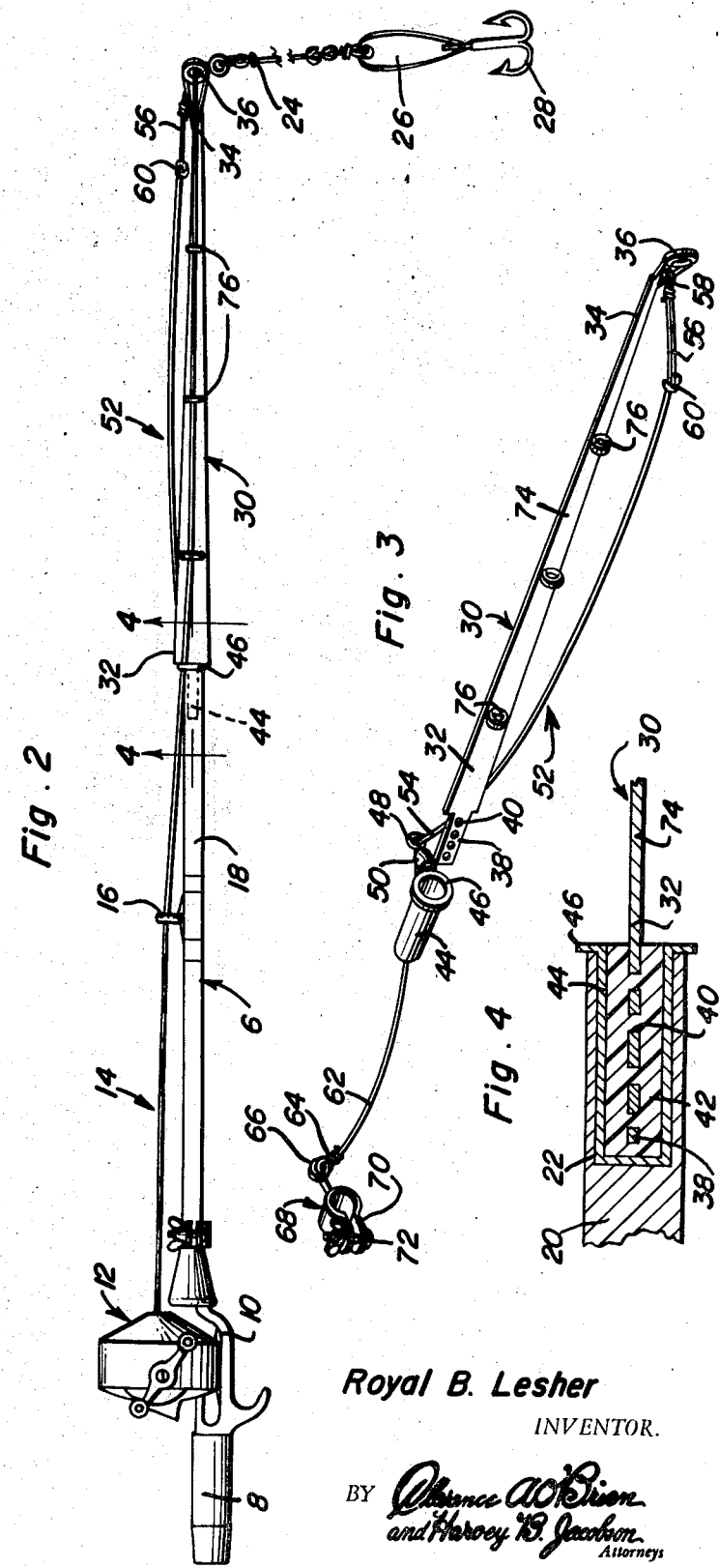
Royal B. Lesher
*INVENTOR.*
BY *Clarence A. O'Brien*
and *Harvey B. Jacobson*
*Attorneys*

United States Patent Office 3,559,328
Patented Feb. 2, 1971

3,559,328
LINE-CASTER ATTACHMENT FOR FISHING ROD
Royal B. Lesher, Spenard, Alaska
(3200 W. 29th Turnagain S., Anchorage, Alaska 99503)
Filed Dec. 24, 1968, Ser. No. 786,697
Int. Cl. A01k *91/02*
U.S. Cl. 43—19                8 Claims

ABSTRACT OF THE DISCLOSURE

A manually actuable self-contained automatic caster attachment which can be readily mounted on a casting rod without altering said rod and where there is insufficient room for a backcast. A bendable spring steel or equivalent strip member is provided with guide eyes and a tip-end-eye for the lure-equipped fishing line. When the strip member is bent back, it is momentarily cocked by a novelly mounted pull-string. When the angler releases the suitably tautened string, the momentum imparted to the fishing line carries the line and lure out over the water.

---

This invention relates to an automatic line caster which is unique in that it is capable of being readily applied and mounted on an unaltered casting rod and is such in construction and adaptability that it enables the user to merely catch hold of a uniquely rigged pull-string, whereupon by tautening it and then releasing it, a spring-biased strip member or arm comes into play to cast the line out.

Persons conversant with the many methods of casting are doubtless aware of the bow-and-arrow cast used in spinning or fly casting where there is insufficient room for a backcast. To the ends desired, the lure is held by the hook in one hand and drawn back to tighten the line and bend the resilient outer or forward end of the rod in an arc toward the caster. When the lure is released the rod snaps straight and shoots the lure forward and the momentum carries the lure out. This manner of casting is shown, for example, in a patent to Mason, 3,142,127, wherein the reel is provided with means for reeling in on the line and imposing sufficient tension on the line to resiliently bow the rod into an arc. This patent is, however, mentioned for background purposes only and to stress the fact that the present invention does not contemplate using the complete or full sectional rod but the reel-equipped portion wherein the forward or outer end is provided with the usual socket means which, in the instant presentation, serves to accommodate a readily attachable and detachable self-contained line-caster attachment. With the novel attachment applied to the conventional casting rod, the user can cast from a pier, wharf, boat or the shore without encountering interference with other close-at-hand fishermen.

Briefly, the herein disclosed manner of casting has to do, as already stated, with a conventional unaltered casting rod having handle means at the butt or inward end, a spinning reel operatively mounted on the inner end and a fishing line stored for use on the reel and having an outer, free, lure-equipped end which is adapted to be cast and payed out in the usual way. The usual rod sections which normally constitute the median and outer end portions of the rod are omitted and the manually-regulable mechanical line-caster attachment, which constitutes the present invention, is substituted therefor. This casting means is provided with guide eyes through which portions of the fishing line are slidingly threaded. It is bendably resilient and capable of having its free forward end and median body portions bent rearwardly and arcuately flexed and directed toward the angler and thus placed temporarily under tension. The preferred means comprises an elongated normally straight but manually flexible strip member having a free forward end provided with a fixed laterally offset tip-eye. For best results a pull-string of requisite length is provided and has an outer end tied to the tip-eye and an intermediate portion threaded slidingly through a limit stop eye. The limit stop eye is swivelly mounted and the pull string is provided with a stop knot which functions in the manner hereinafter more specifically set forth.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a plan view showing the conventional-type reel-equipped rod at the left and showing the self-contained line caster attachment at the right, showing how the fishing line is attached thereto and how the manually manipulable pull-string can be used to flex and bend the resilient strip member to assume a cocked position.

FIG. 2 is a view in side elevation showing certain aspects of the concept which are not wholly evident from FIG. 1.

FIG. 3 is a view in perspective showing the over-all attachment with the tang at the left detached from the flanged adapter socket.

FIG. 4 is an enlarged fragmentary detail sectional view taken approximately on the plane of the section line 4—4 of FIG. 2 looking in the direction of the indicating arrows.

With reference first to the aforementioned conventional type fishing or casting rod, this is denoted by the numeral 6 and is characterized as usual by a handgrip 8 at the inner or butt end, a reel seat 10 and a spinning reel 12 mounted on the seat and with the fishing line 14 slidingly threaded through a guide eye 16 on the sectional rod means 18. The right-hand end portion 20 (FIG. 4) of the rod means is provided with an axial female socket 22, which in normal practice would serve to accommodate complemental rod sections (not shown) which when in place would complete the over-all casting rod. For convenience of description here, the forward or outer end portion of the line is designated in FIG. 2 by the numeral 24 and is provided with a lure 26 and an attached fishhook 28.

The self-contained line-caster attachment comprises a bendably resilient elongated strip member 30 (FIG. 3). This member is preferably a length of flat-faced suitable spring steel which is gradually decreased or tapered in width from the inner end 32 to the outer or forward end 34. The oblique-angled tip-eye is denoted at 36. The widened end portion of the strip member 30 is fashioned into a tongue or tang 38 with apertures 40. In practice, this apertured tongue is embedded in plastic filler means 42 which is loaded in the receptacle portion of an elongate adapter socket 44. This socket is of a length and cross-section to be fitted and frictionally retained in the socket 22, as brought out in FIG. 4. The outer end is formed with an abutment flange 46. An outstanding or offset pull-string eye 48 is swivelly mounted on a marginal edge portion of the flange 46 by way of an offsetting shank 50.

With particular reference now to the aforementioned prescribed manually grippable and actuatable pull-string, this is denoted by the numeral 52 and has its median portion 54 slidingly threaded through the swivel eye 48. The leading end portion 56 is connected at 58 to the offset tip-eye 36. At a predetermined point to the left of the eye a limit stop knot 60 is provided. The rearward or inward end portion 62 is tied as at 64 to a suitably offset integrally-mounted eye 66 mounted on an anchoring clamp 68. The ear portions 70 of the clamp are connected by a bolt 72 having a wing nut thereon in the manner shown. Manifestly, the anchoring clamp 68 is applied to that portion of the rod just forwardly of the reel 12. With reference again to the bendably resilient strip member 30, it will be seen that at least one side surface 74 is provided with longitudinally-spaced, fixedly-mounted line-guide eyes 76.

It is reiterated that the line caster attachment is such in construction and adaptability that it can be mounted on a conventional-type casting rod 6. When mounted in position as brought out in the several views of the drawing it will be evident that the gradually-narrowing, spring steel strip member 30 projects a suitable distance beyond the end portion 20 of the rod. In practice, this spring steel may be of uniform thickness ranging from $\frac{1}{32}$ inch to $\frac{1}{16}$ inch. When the attachment is installed, the pull-string 52 is substantially taut as is believed to be evident from the showing in FIG. 1. The fishing line is threaded first through the guide eye 16 and then through the several guide eyes 76 and finally through the tip-eye 36 where the end portion 24 is readied for use as shown in FIG. 2. The rod is held in a customary manner in the right hand of the user. The pull-string is thus readily accessible and can be caught hold of by the left hand and pulled and kept tight until the strip member 30 is bent from the straight position to the curvate or arcuate position shown in phantom lines in FIG. 1. The knot 60 on the pull-string acts as a limit stop against the swivel eye 48. Accordingly, when the thus tensioned string is released the inherent properties of the strip member 30 come into play and serve to provide the momentum required to carry the lure out over the water being fished.

It is believed that the components which go to make up the over-all attachment are clearly shown in the exploded view designated as FIG. 3. The manner of securing the apertured tang 38 in the plastic-filled adapter socket 44 is evident in FIG. 4. The manner in which the fishing line and pull-string are rigged and readied for use is clearly brought out in FIGS. 1 and 2. A more extended description is deemed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a casting rod having handle means at an inward end, a spinning reel operatively mounted on said inward end, a fishing line stored for use on said reel and having a free lure-equipped outer end adapted to be cast and payed out at will, and manually-controllable mechanical line casting means operatively mounted on the outward end of said rod, said casting means being bendably resilient and having guide eyes thereon through which portions of the line are slidingly threaded, said casting means being capable of having its free forward end and median body portion bent rearwardly and arcuately flexed and directed toward the angler and thus placed temporarily under tension, whereby when intentionally released said means functions to automatically cast the fishing line forwardly and outwardly over the water which is being fished, said casting means comprising a self-contained bodily applicable and removable attachment characterized by an elongated normally straight but manually flexible strip member having a free forward end provided with a fixed laterally offset tip-eye, said guide eyes being fixed at longitudinally spaced points to one side of said strip member in oriented cooperating alignment with said tip-eye, the outward end of said rod terminating in a female socket, the adjacent rearward end of said strip member having a socket member fixed thereon, said socket member providing a male adapter and being telescopingly operatively plugged into said female socket and separably mounting the strip member on and in normal axial alignment with said casting rod.

2. The combination defined in and according to claim 1, and wherein said socket member is provided on an exterior side surface with a radially-projecting shank, said shank terminating in a swivelly-mounted, line-guiding and limit-stop eye, and, in combination, a pull-string of requisite length having an outer end tied to said tip-eye and an intermediate portion threaded slidingly through said limit stop eye and provided with a stop knot which is engageable with said limit-stop eye.

3. The combination defined in and according to claim 2, and wherein said rod adjacent said handle is equipped with anchoring means to which an inner end of said pull-string is tied and anchored in a suitably functioning position.

4. For use on a fishing rod having a forward end provided with an adapter-receiving socket, a self-contained caster attachment comprising a normally-straight elongated strip member made of flexible resilient material, said strip member having a free forward end provided with a tip-eye and a rearward end provided with a socket member adapted to be plugged and retentively frictionally held in said socket member, said socket member having a flange providing a stop shoulder capable of abutting a coacting forward end of said rod, the median portion of said strip member being provided with guide eyes for a fishing line, said stop shoulder flange having a marginal edge provided with a radial shank, said shank having an outer terminal end provided with a swivelly mounted eye for passage of a portion of a manually manipulable pull-string.

5. The caster attachment defined in and according to claim 4, and, in combination, an anchoring clamp adapted to be clampingly mounted on said rod at a predetermined place, said clamp being equipped with an outstanding anchoring eye for an end of said pull-string.

6. The caster attachment defined in and according to claim 5, and, in combination, a pull-string of a prescribed length having a median portion slidingly threaded through said swivelly mounted eye, a rearward end portion tied to said anchoring eye, and a forward end portion tied to said tip-eye and provided adjacent said tip-eye with a limit stop knot capable of coming into engagement with said swivelled eye.

7. The combination defined in and according to claim 1, and wherein said socket member is provided with a swivelly mounted limit stop line-guiding eye, a pull-string having an outer end secured to said tip-eye and portion passing slidingly through said limit stop eye and provided with stop means adapted to engage said limit stop eye, and string anchoring means mounted on said rod, the inner end of said pull-string being secured to said anchoring means.

8. The caster attachment defined in and according to claim 4, and, in combination, an anchoring clamp adapted to be clampingly mounted on said rod at a predetermined place, said clamp being equipped with an anchoring eye for an end of said pull-string, a pull-string having a portion slidingly threaded through said swivelly mounted eye, a rearward end portion connected to said anchoring eye, and a forward end portion secured to said tip-eye and provided adjacent said tip-eye with limit stop means adapted to come into engagement with said swivelly mounted eye.

References Cited

UNITED STATES PATENTS

| | | | |
|---|---|---|---|
| 2,381,089 | 8/1945 | Tweit | 43—19 |
| 2,593,885 | 4/1952 | James | 43—19 |
| 3,143,823 | 8/1964 | Brown et al. | 43—19 |
| 3,152,820 | 10/1964 | Giampa et al. | 43—18X |
| 3,436,858 | 4/1969 | Shaffer | 43—19 |

SAMUEL KOREN, Primary Examiner

D. J. LEACH, Assistant Examiner

U.S. Cl. X.R.

124—7